(12) United States Patent
Vandervaart

(10) Patent No.: US 12,377,480 B2
(45) Date of Patent: Aug. 5, 2025

(54) BAND SAW WITH CONSECUTIVE TEETH SETS

(71) Applicant: The M. K. Morse Company, Canton, OH (US)

(72) Inventor: Peter Christopher Vandervaart, North Canton, OH (US)

(73) Assignee: The M.K. Morse Company, Canton, OH (US)

( * ) Notice: Subject to any disclaimer, the term of this patent is extended or adjusted under 35 U.S.C. 154(b) by 273 days.

(21) Appl. No.: 17/633,304

(22) PCT Filed: Aug. 17, 2020

(86) PCT No.: PCT/US2020/046711
§ 371 (c)(1),
(2) Date: Feb. 7, 2022

(87) PCT Pub. No.: WO2021/034781
PCT Pub. Date: Feb. 25, 2021

(65) Prior Publication Data
US 2022/0347773 A1  Nov. 3, 2022

Related U.S. Application Data

(60) Provisional application No. 62/887,895, filed on Aug. 16, 2019.

(51) Int. Cl.
*B23D 61/12* (2006.01)

(52) U.S. Cl.
CPC ....... *B23D 61/121* (2013.01); *B23D 61/1212* (2024.05); *B23D 61/1216* (2024.05)

(58) Field of Classification Search
CPC ............... B23D 61/021; B23D 61/121; B23D 61/1212; B23D 61/1216; Y10T 83/9358; Y10T 83/9319; Y10T 83/935; Y10T 83/9317; Y10T 83/9346
USPC .......................... 83/851, 835, 848, 661, 846
See application file for complete search history.

(56) References Cited

U.S. PATENT DOCUMENTS

| | | | |
|---|---|---|---|
| 5,606,900 A | 3/1997 | Stoddard | |
| 5,832,803 A * | 11/1998 | Hayden, Sr. | ......... B23D 61/121 83/846 |
| 6,003,422 A * | 12/1999 | Holston | ............... B23D 61/121 83/846 |

(Continued)

OTHER PUBLICATIONS

International Preliminary Report on Patentability dated Feb. 17, 2022 filed in the corresponding PCT Application; 7 pages.

(Continued)

*Primary Examiner* — Evan H MacFarlane
(74) *Attorney, Agent, or Firm* — Black McCuskey

(57) ABSTRACT

A band saw blade includes a generally planar blade backer having generally parallel right and left sides opposite each other. The blade also includes a plurality of consecutive sets of teeth disposed on a top edge of the blade backer. Each set includes a first straight tooth, a second set tooth, following the first straight tooth and being one of left-set or right-set, a third set tooth, following the second set tooth and being the other of left-set or right set, a fourth set tooth, following the third set tooth and being set in the same direction as the second set tooth, and a fifth set tooth, following the fourth set tooth and being set in the same direction as the third set tooth.

12 Claims, 2 Drawing Sheets

(56) References Cited

U.S. PATENT DOCUMENTS

| 7,036,415 B2 | 5/2006 | Tsujimoto |
| 7,913,601 B2 * | 3/2011 | Petts .................... B23D 61/121 |
| | | 83/846 |
| 8,621,972 B2 | 1/2014 | Nagano |
| 10,537,951 B2 * | 1/2020 | Hunter .................... B27B 33/02 |
| 2011/0132168 A1 * | 6/2011 | Nagano ................ B23D 61/121 |
| | | 83/661 |
| 2016/0008899 A1 * | 1/2016 | Hunter ................. B23D 61/121 |
| | | 83/849 |

OTHER PUBLICATIONS

International Search Report dated Nov. 4, 2020 filed in the corresponding PCT Application; 2 pages.
Written Opinion of the International Searching Authority dated Nov. 4, 2020 filed in the corresponding PCT Application; 6 pages.

\* cited by examiner

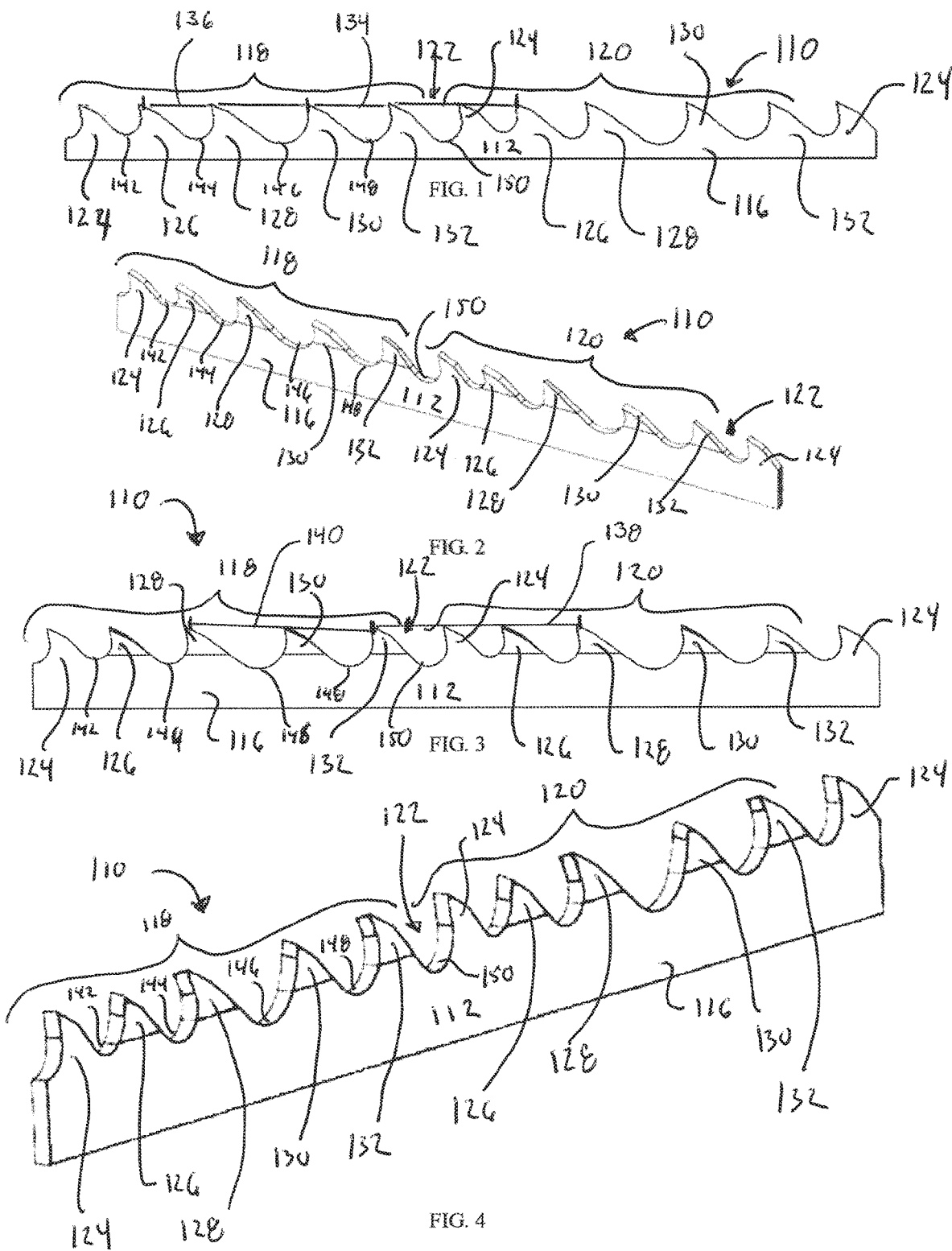

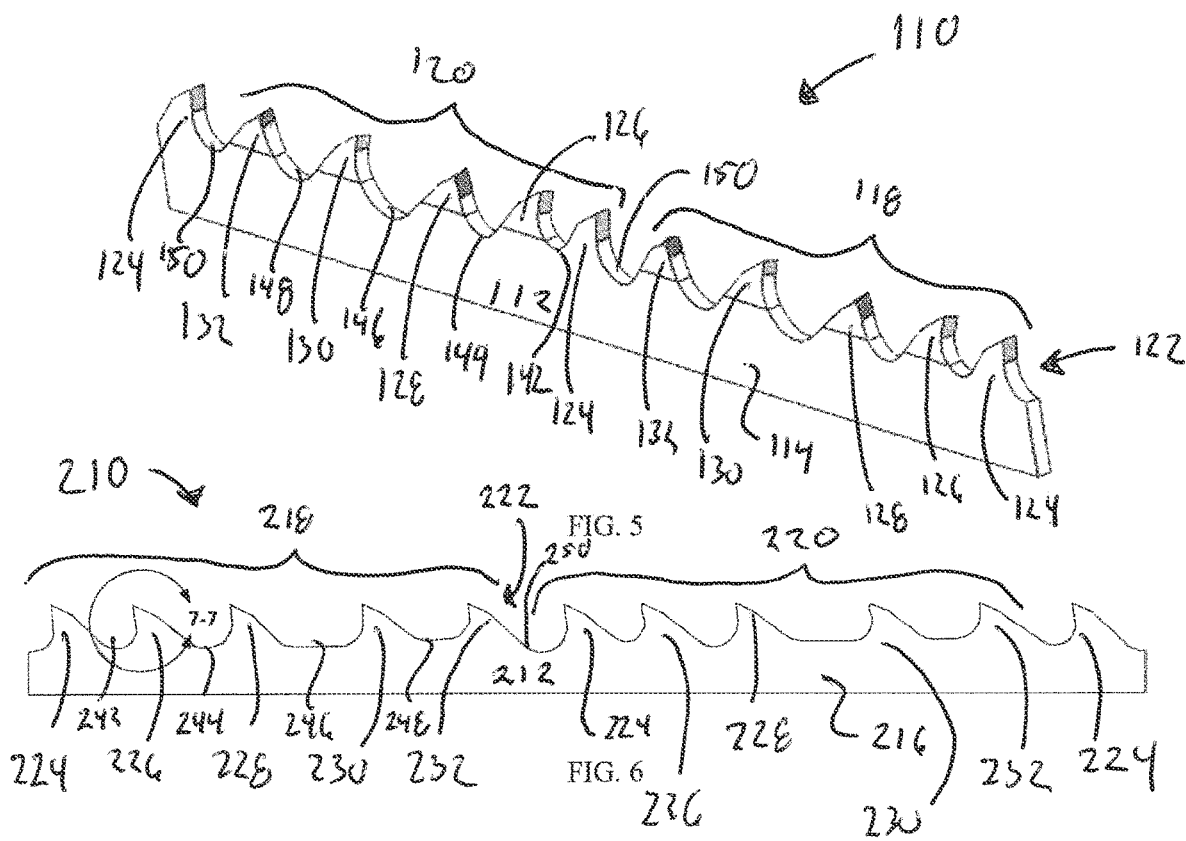
FIG. 5
FIG. 6
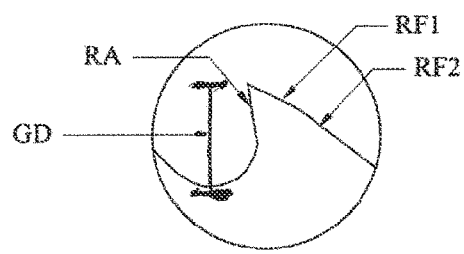
FIG. 7

BAND SAW WITH CONSECUTIVE TEETH SETS

CROSS-REFERENCE TO RELATED APPLICATIONS

This application claims priority to and the benefit of U.S. Provisional Patent Application No. 62/887,895, Filed 16 Aug. 2019, the contents of which are hereby incorporated by reference in their entirety.

BACKGROUND

This is related in general to band saws. Generally, band saws are used to cut curves or other irregular shapes, and are often used for thicker or larger pieces of lumber as compared to that of other saws.

Band saws typically include a relatively flat planar band saw blade with a plurality of teeth disposed on a blade backer. Different band saw blades include differing teeth geometry depending upon design. For example, a band saw blade may include multiple saw teeth including straight teeth, right-set teeth and/or left-set teeth, and may also include one or more gullet portions provided therebetween the saw teeth. Each tooth nay be finished with a particular rake angle and one or more relief surfaces.

SUMMARY

This relates more particularly to a band saw blade including a generally planar blade backer having generally parallel right and left sides opposite each other, and including a plurality of consecutive sets of teeth disposed on the top edge of the blade backer.

In at least one embodiment, a band saw blade includes a generally planar blade backer having generally parallel right and left sides opposite each other. The band saw includes a plurality of consecutive sets of teeth disposed on a top edge of the blade backer. Each set includes a first straight tooth, a second set tooth, following the first straight tooth and being one of left-set or right-set, a third set tooth, following the second set tooth and being the other of left-set or right set, a fourth set tooth, following the third set tooth and being set in the same direction as the second set tooth, and a fifth set tooth, following the fourth set tooth and being set in the same direction as the third set tooth.

In at least one embodiment, the tip-to-tip distance between the fourth set tooth of one set and the second set tooth of the next set is between 0.70 times and 1.30 times the tip-to-tip distance between the second set tooth and the fourth set tooth in the one set. Further, the tip-to-tip distance between the fourth set tooth of one set and the second set tooth of the next set may be between 0.75 times and 1.25 times the tip-to-tip distance between the second set tooth and the fourth set tooth in the one set. Additionally, the tip-to-tip distance between the fourth set tooth of one set and the second set tooth of the next set may be between 1.00 times and 1.25 times the tip-to-tip distance between the second set tooth and the fourth set tooth in the one set.

In at least one embodiment, the tip-to-tip distance between the fifth set tooth of one set and the third set tooth of the next set is between 0.70 times and 1.30 times the tip-to-tip distance between the third set tooth and the fifth set tooth in the one set. Further the tip-to-tip distance between the fifth set tooth of one set and the third set tooth of the next set may be between 0.75 times and 1.25 times the tip-to-tip distance between the third set tooth and the fifth set tooth in the one set. Additionally, the tip-to-tip distance between the fifth set tooth of one set and the third set tooth of the next set may be between 1.00 times and 1.25 times the tip-to-tip distance between the third set tooth and the fifth set tooth in the one set.

In at least one embodiment, each teeth set includes a first gullet formed in the top edge of the blade backer and disposed between the first straight tooth and the second set tooth, a second gullet formed in the top edge of the blade backer and disposed between the second set tooth and the third set tooth, and a third gullet formed in the top edge of the blade backer and disposed between the third set tooth and the fourth set tooth. The third gullet has a greater gullet depth than the first gullet and the second gullet. Further, the depth of the second gullet may be greater than the depth of the first gullet.

In at least one embodiment, the second set tooth and the fourth set tooth are left set and the third set tooth and the fifth set tooth are right set. It may be that second set tooth and the fourth set tooth are right set and the third set tooth and the fifth set tooth are left set.

In at least one embodiment, each tooth has a first relief surface and a second relief surface meeting at an angle.

In at least one embodiment, the second set tooth and the fourth set tooth are equally set Additionally or alternatively, the third set tooth and the fifth set tooth may be equally set.

It must be understood that various additional embodiments include the combination of one or more of the embodiments above with each of one or more of the others.

Various aspects will become apparent to those skilled in the art from the following detailed descriptions and the accompanying drawings.

BRIEF DESCRIPTION OF THE DRAWINGS

There is illustrated in the various figures several views of various embodiments of a band saw.

FIG. 1 is a left side schematic view of a portion of band saw blade with a plurality of teeth sets according to an embodiment.

FIG. 2 is a rear left perspective view of the portion of the band saw blade of FIG. 1.

FIG. 3 is a left side view of the portion of the band saw blade of FIG. 1.

FIG. 4 is a front left perspective view of the portion of the band saw blade of FIG. 1.

FIG. 5 is a front right perspective view of the portion of the band saw blade of FIG. 1.

FIG. 6 is a left side schematic view similar to FIG. 1 of a portion of band saw blade with a plurality of teeth sets according to an other embodiment.

FIG. 7 is an enlarged portion of FIG. 6 taken at circle 7-7.

DETAILED DESCRIPTION

Note, the further embodiment shown in FIG. 7 is labeled with similar identifiers, except 100 greater, as to the embodiment to FIGS. 1-6, and should be understood to be similar except as noted otherwise.

Referring to the drawings, a band saw blade 110 includes a generally planar blade backer 112 having generally parallel right and left sides 114 and 116 opposite each other. A plurality of consecutive sets of teeth 118 and 120 are disposed on a top edge 122 of the blade backer 112. Each set 118 and 120 include a first straight tooth 124, a second set tooth 126, following the first straight tooth 124 and being one of left-set or right-set (shown left set), a third set tooth 128, following the second set tooth 126 and being the other of left-set or right set, a fourth set tooth 130, following the third set tooth 128 and being set in the same direction as the second set tooth 126; and a fifth set tooth 132, following the fourth set tooth 130 and being set in the same direction as the third set tooth 128.

The tip-to-tip distance 134 between the fourth set tooth 130 of one set 118 and the second set tooth 126 of the next set 120 is between 0.70 times and 1.30 times the tip-to-tip distance 136 between the second set tooth 126 and the fourth set tooth 130 in the one set 118.

Further, the tip-to-tip distance 134 between the fourth set tooth 130 of one set 118 and the second set tooth 126 of the next set 120 is preferably between 0.75 times and 1.25 times the tip-to-tip distance 136 between the second set tooth 126 and the fourth set tooth 130 in the one set 118.

Most preferably, the tip-to-tip distance 134 between the fourth set tooth 130 of one set 118 and the second set tooth 126 of the next set 120 is between 1.00 times and 1.25 times the tip-to-tip distance 136 between the second set tooth 126 and the fourth set tooth 130 in the one set 118.

The tip-to-tip distance 138 between the fifth set tooth 132 of one set 118 and the third set tooth 128 of the next set 120 is between 0.70 times and 1.30 times the tip-to-tip distance 140 between the third set tooth 128 and the fifth set tooth 132 in the one set 118.

Further, the tip-to-tip distance 138 between the fifth set tooth 132 of one set 118 and the third set tooth 128 of the next set 120 is preferably between 0.75 times and 1.25 times the tip-to-tip distance 140 between the third set tooth 128 and the fifth set tooth 132 in the one set 118.

Most preferably, the tip-to-tip distance 138 between the fifth set tooth 132 of one set 118 and the third set tooth 128 of the next set 120 is between 1.00 times and 1.25 times the tip-to-tip distance 140 between the third set tooth 128 and the fifth set tooth 132 in the one set 118.

Each set 118 and 120 includes a first gullet 142 formed in the top edge 122 of the blade backer 112 and disposed between the first straight tooth 124 and the second set tooth 126, a second gullet 144 formed in the top edge 122 of the blade backer 112 and disposed between the second set tooth 126 and the third set tooth 128, a third gullet 146 formed in the top edge 122 of the blade backer 112 and disposed between the third set tooth 128 and the fourth set tooth 130, a fourth gullet 148 formed in the top edge 122 of the blade backer 112 and disposed between the fourth set tooth 130 and the fifth set tooth 132, a fifth gullet 150 formed in the top edge 122 of the blade backer 112 and disposed between the fifth set tooth 132 and the first straight tooth 124 of the next set.

The first gullet 142 has a maximum first gullet depth and a maximum first gullet length. The second gullet 144 has a maximum second gullet depth and a maximum second gullet length. The third gullet 146 has a maximum third gullet depth and a maximum third gullet length. The fourth gullet 148 has a maximum fourth gullet depth and a maximum fourth gullet length. The fifth gullet 150 has a maximum fifth gullet depth and a maximum fifth gullet length. Preferably the maximum third gullet depth is greater than the maximum first gullet depth the maximum second gullet depth. Additionally or alternatively the maximum third gullet length may be greater than the maximum first gullet length or the maximum second gullet length.

Further, the maximum second gullet depth is preferably greater than the maximum first gullet depth, although such is not required.

In the illustrated embodiments the second set tooth 126 and the fourth set tooth 130 are left set and the third set tooth 128 and the fifth set tooth 132 are right set. However, it must be understood that the second set tooth 126 and the fourth set tooth 130 may be right set and the third set tooth 128 and the fifth set tooth 132 may be left set.

Preferably, the second set tooth 126 and the fourth set tooth 130 are equally set. It is also preferred that the third set tooth 128 and the fifth set tooth 132 are equally set.

As best shown in FIG. 7, each tooth has a first relief surface RF1 and a second relief surface RF2 meeting at an angle. Each tooth has a gullet depth GD and rake angle RA.

While principles and modes of operation have been explained and illustrated with regard to particular embodiments, it must be understood, however, that this may be practiced otherwise than as specifically explained and illustrated without departing from its spirit or scope.

What is claimed is:

1. A band saw blade comprising:
   a planar blade backer having parallel right and left sides opposite each other; and
   a plurality of consecutive sets of teeth disposed on a top edge of the blade backer, where each of the sets of teeth includes:
   a first straight tooth;
   a second set tooth, following the first straight tooth and being one of left-set or right-set;
   a third set tooth, following the second set tooth and being the other of left-set or right set;
   a fourth set tooth, following the third set tooth and being set in the same direction as the second set tooth; and
   a fifth set tooth, following the fourth set tooth and being set in the same direction as the third set tooth; and
   where each of the sets of teeth further includes:
   a first gullet formed in the top edge of the blade backer and disposed between the first straight tooth and the second set tooth, the first gullet having a maximum first gullet depth and a maximum first gullet length;
   a second gullet formed in the top edge of the blade backer and disposed between the second set tooth and the third set tooth, the second gullet having a maximum second gullet depth and a maximum second gullet length; and
   a third gullet formed in the top edge of the blade backer and disposed between the third set tooth and the fourth set tooth, the third gullet having a maximum third gullet depth and a maximum third gullet length;
   where the maximum third gullet depth is greater than the maximum first gullet depth and the maximum second gullet depth;
   where the maximum second gullet depth is greater than the maximum first gullet depth; and
   where the maximum third gullet length is greater than the maximum first gullet length and the maximum second gullet length; and
   where the plurality of consecutive sets of teeth includes a first set of teeth and a second set of teeth, the second set of teeth being consecutive with the first set of teeth, and the plurality of consecutive sets of teeth having a first tip-to-tip distance between the fourth set tooth of the first set of teeth and the second set tooth of the second set of teeth and a second tip-to-tip distance between the second set tooth and the fourth set tooth in the first set of teeth and where the first tip-to-tip distance between the fourth set tooth of the first set of teeth and the second set tooth of the second set of teeth is between 1.00 times and 1.25 times the second tip-to-tip distance between the second set tooth and the fourth set tooth in the first set of teeth, and the plurality of consecutive sets of teeth having a third tip-to-tip distance between the fifth set tooth of the first set of teeth and the third set tooth of the second set of teeth and a fourth tip-to-tip distance between the third set tooth and the fifth set tooth in the first set of teeth and where the third tip-to-tip distance between the fifth set tooth of the first set of teeth and the third set tooth of the second set of teeth is between 1.00 times and 1.25 times the fourth tip-to-tip distance between the third set tooth and the fifth set tooth in the first set of teeth.

2. The band saw blade of claim 1 where the second set tooth of each of the consecutive sets of teeth and the fourth set tooth of each of the consecutive sets of teeth are left set, and the third set tooth of each of the consecutive sets of teeth and the fifth set tooth of each of the consecutive sets of teeth are right set.

3. The band saw blade of claim 1 where the second set tooth of each of the consecutive sets of teeth and the fourth set tooth of each of the consecutive sets of teeth are right set, and the third set tooth of each of the consecutive sets of teeth and the fifth set tooth of each of the consecutive sets of teeth are left set.

4. The band saw blade of claim 1 where each of the first, second, third, fourth, and fifth teeth of each of the consecutive sets has a first relief surface and a second relief surface meeting at an angle.

5. The band saw blade of claim 1 where the second set teeth of each of the consecutive sets of teeth and the fourth set teeth of each of the consecutive sets of teeth are equally set.

6. The band saw blade of claim 1 where the third set teeth of each of the consecutive sets of teeth and the fifth set teeth of each of the consecutive sets of teeth are equally set.

7. A band saw blade comprising:
a planar blade backer having parallel right and left sides opposite each other; and
a plurality of consecutive sets of teeth disposed on a top edge of the blade backer, where each of the plurality of consecutive sets of teeth includes:
a first straight tooth;
a second set tooth, following the first straight tooth and being one of left-set or right-set;
a third set tooth, following the second set tooth and being the other of left-set or right set;
a fourth set tooth, following the third set tooth and being set in the same direction as the second set tooth; and
a fifth set tooth, following the fourth set tooth and being set in the same direction as the third set tooth;
where the plurality of consecutive sets of teeth includes a first set of teeth and a second set of teeth, the second set of teeth being consecutive with the first set of teeth, and the plurality of consecutive sets of teeth having a first tip-to-tip distance between the fourth set tooth of the first set of teeth and the second set tooth of the second set of teeth and a second tip-to-tip distance between the second set tooth and the fourth set tooth in the first set of teeth and where the first tip-to-tip distance between the fourth set tooth of the first set of teeth and the second set tooth of the second set of teeth is between 0.70 times and 1.30 times the second tip-to-tip distance between the second set tooth and the fourth set tooth in the first set of teeth, and the plurality of consecutive sets of teeth having a third tip-to-tip distance between the fifth set tooth of the first set of teeth and the third set tooth of the second set of teeth and a fourth tip-to-tip distance between the third set tooth and the fifth set tooth in the first set of teeth and where the third tip-to-tip distance between the fifth set tooth of the first set of teeth and the third set tooth of the second set of teeth is between 1.00 times and 1.25 times the fourth tip-to-tip distance between the third set tooth and the fifth set tooth in the first set of teeth; and
where each of the sets of the plurality of consecutive sets of teeth further includes:
a first gullet formed in the top edge of the blade backer and disposed between the first straight tooth and the second set tooth, the first gullet having a maximum first gullet depth and a maximum first gullet length;
a second gullet formed in the top edge of the blade backer and disposed between the second set tooth and the third set tooth, the second gullet having a maximum second gullet depth and a maximum second gullet length; and
a third gullet formed in the top edge of the blade backer and disposed between the third set tooth and the fourth set tooth, the third gullet having a maximum third gullet depth and a maximum third gullet length;
where the maximum third gullet depth is greater than the maximum first gullet depth and the maximum second gullet depth; and
where the maximum second gullet depth is greater than the maximum first gullet depth; and
where the maximum third gullet length is greater than the maximum first gullet length and the maximum second gullet length.

8. The band saw blade of claim 7 where the second set teeth of each of the consecutive sets of teeth and the fourth set teeth of each of the consecutive sets of teeth are left set and the third set teeth of each of the consecutive sets of teeth and the fifth set teeth of each of the consecutive sets of teeth are right set,
where the second set teeth of each of the consecutive sets of teeth and the fourth set teeth of each of the consecutive sets of teeth are equally set, and
where the third set teeth of each of the consecutive sets of teeth and the fifth set teeth of each of the consecutive sets of teeth are equally set.

9. The band saw blade of claim 7 where the second set teeth of each of the consecutive sets of teeth and the fourth set teeth of each of the consecutive sets of teeth are right set and the third set teeth of each of the consecutive sets of teeth and the fifth set teeth of each of the consecutive sets of teeth are left set,
where the second set teeth of each of the consecutive sets of teeth and the fourth set teeth of each of the consecutive sets of teeth are equally set, and
where the third set teeth of each of the consecutive sets of teeth and the fifth set teeth of each of the consecutive sets of teeth are equally set.

10. A band saw blade comprising:
a planar blade backer having parallel right and left sides opposite each other; and
a plurality of consecutive sets of teeth disposed on a top edge of the blade backer, where each of the sets of the plurality of consecutive sets of teeth includes:
a first straight tooth;
a second set tooth, following the first straight tooth and being one of left-set or right-set;
a third set tooth, following the second set tooth and being the other of left-set or right set;

a fourth set tooth, following the third set tooth and being set in the same direction as the second set tooth; and a fifth set tooth, following the fourth set tooth and being set in the same direction as the third set tooth;

where the plurality of consecutive sets of teeth includes a first set of teeth and a second set of teeth, the second set of teeth being consecutive with the first set of teeth, and the plurality of consecutive sets of teeth having a first tip-to-tip distance between the fifth set tooth of the first set of teeth and the third set tooth of the second set of teeth and a second tip-to-tip distance between the third set tooth and the fifth set tooth in the first set of teeth, and where the first tip-to-tip distance between the fifth set tooth of the first set and the third set tooth of the second set of teeth is between 0.70 times and 1.30 times the second tip-to-tip distance between the third set tooth and the fifth set tooth in the first set of teeth, and the plurality of consecutive sets of teeth having a third tip-to-tip distance between the fourth set tooth of the first set of teeth and the second set tooth of the second set of teeth and a fourth tip-to-tip distance between the second set tooth and the fourth set tooth in the first set of teeth and where the third tip-to-tip distance between the fourth set tooth of the first set of teeth and the second set tooth of the second set of teeth is between 1.00 times and 1.25 times the fourth tip-to-tip distance between the second set tooth and the fourth set tooth in the first set of teeth; and where each of the sets of the plurality of consecutive sets of teeth further includes:

a first gullet formed in the top edge of the blade backer and disposed between the first straight tooth and the second set tooth, the first gullet having a maximum first gullet depth and a maximum first gullet length;

a second gullet formed in the top edge of the blade backer and disposed between the second set tooth and the third set tooth, the second gullet having a maximum second gullet depth and a maximum second gullet length; and a third gullet formed in the top edge of the blade backer and disposed between the third set tooth and the fourth set tooth, the third gullet having a maximum third gullet depth and a maximum third gullet length;

where the maximum third gullet depth is greater than the maximum first gullet depth and the maximum second gullet depth; and where the maximum second gullet depth is greater than the maximum first gullet depth; and where the maximum third gullet length is greater than the maximum first gullet length and the maximum second gullet length.

11. The band saw blade of claim 10 where the second set teeth of each of the consecutive sets of teeth and the fourth set teeth of each of the consecutive sets of teeth are left set and the third set teeth of each of the consecutive sets of teeth and the fifth set teeth of each of the consecutive sets of teeth are right set, where the second set teeth of each of the consecutive sets of teeth and the fourth set teeth of each of the consecutive sets of teeth are equally set, and where the third set teeth of each of the consecutive sets of teeth and the fifth set teeth of each of the consecutive sets of teeth are equally set.

12. The band saw blade of claim 10 where the second set teeth of each of the consecutive sets of teeth and the fourth set teeth of each of the consecutive sets of teeth are right set and the third set teeth of each of the consecutive sets of teeth and the fifth set teeth of each of the consecutive sets of teeth are left set, where the second set teeth of each of the consecutive sets of teeth and the fourth set teeth of each of the consecutive sets of teeth are equally set, and where the third set teeth of each of the consecutive sets of teeth and the fifth set teeth of each of the consecutive sets of teeth are equally set.

* * * * *